United States Patent
Kalte et al.

(10) Patent No.: US 12,197,336 B2
(45) Date of Patent: Jan. 14, 2025

(54) METHOD FOR EFFECTIVELY INCREASING A MEMORY ON AN FPGA

(71) Applicant: dSPACE GmbH, Paderborn (DE)

(72) Inventors: Heiko Kalte, Paderborn (DE); Dominik Lubeley, Paderborn (DE)

(73) Assignee: dSPACE GMBH, Paderborn (DE)

( * ) Notice: Subject to any disclaimer, the term of this patent is extended or adjusted under 35 U.S.C. 154(b) by 12 days.

(21) Appl. No.: 18/213,029

(22) Filed: Jun. 22, 2023

(65) Prior Publication Data

US 2023/0418752 A1 Dec. 28, 2023

(30) Foreign Application Priority Data

Jun. 23, 2022 (DE) ................... 10 2022 115 704.0

(51) Int. Cl.
*G06F 12/08* (2016.01)
*G06F 12/0862* (2016.01)

(52) U.S. Cl.
CPC .............. *G06F 12/0862* (2013.01)

(58) Field of Classification Search
CPC ............ G06F 12/0895; G06F 12/0862; G06F 12/0888; G06F 2201/885; G06F 2212/1044; G06F 2212/601; G06F 30/34
See application file for complete search history.

(56) References Cited

U.S. PATENT DOCUMENTS

| | | | | |
|---|---|---|---|---|
| 2005/0155015 A1* | 7/2005 | Novacek | ............... | G06F 8/34 717/105 |
| 2005/0235253 A1* | 10/2005 | Petersen | ............... | G06F 8/34 717/105 |
| 2011/0138364 A1* | 6/2011 | Hosokawa | .......... | G06F 30/3312 717/129 |

OTHER PUBLICATIONS

Hardware_Acceleration_of_Statistical_Data_Processing_Based_on_FPGAs (Year: 2020).*
Nachiappan, Nachiappan Chidambaram et al: "Application-aware prefetch Prioritization in On-chip Networks" PACT'12, Sep. 19-23, 2012, Minneapolis, Minnesota, ACM 978-1-4503-1182-3/12/09.
Peled, Leeor et al: "Semantic Locality and Context-based Prefetching Using Reinforcement Learning" ISCA'15, Jun. 13-17, 2015, Portland, Oregon, ACM 978-1-4503-3402-0/15/06, pp. 285-297.
Soundararajan, Gokul et al: "Context-Aware Prefetching at the Storage Server" USENIX Annual Technical Conference, 2008, pp. 377-390.

* cited by examiner

*Primary Examiner* — Tracy C Chan
(74) *Attorney, Agent, or Firm* — Muncy, Geissler, Olds & Lowe, P.C.

(57) ABSTRACT

In an FPGA, a memory of the FPGA is to be effectively increased. This is achieved by a computer-implemented method for implementing a model-adaptive cache memory having a model state-dependent memory look-ahead on the FPGA.

15 Claims, 4 Drawing Sheets

METHOD FOR EFFECTIVELY INCREASING A MEMORY ON AN FPGA

This nonprovisional application claims priority under 35 U.S.C. § 119(a) to German Patent Application No. 10 2022 115 704.0, which was filed in Germany on Jun. 23, 2022, and which is herein incorporated by reference.

BACKGROUND OF THE INVENTION

Field of the Invention

The invention relates to a computer-implemented method for implementing a model-adaptive cache having a model state-dependent memory look-ahead on an FPGA for effectively increasing a memory of the FPGA. The invention also relates to the use of the computer-implemented method in rapid control prototyping (RCP) applications and hardware in the loop (HiL) applications, as well as a corresponding computer program product.

Description of the Background Art

An FPGA is an integrated circuit in digital technology, to which a logical circuit may be loaded. In contrast to programming computers, microcontrollers and controllers, the term "programming" in FPGAs does not only mean specifying time sequences but also defining the targeted circuit structure. This circuit structure is formulated with the aid of a hardware description language and then translated by software into a configuration file, which specifies how the elements in the FPGA are to be connected. In FPGA programming, a description of the hardware structure is thus generated, which is then transferred to the actual FPGA with the aid of synthesis and routing tools. This hardware description typically takes place in special languages, such as VHDL or Verilog. Instead of "FPGA programming," this is therefore also referred to as "FPGA configuration." In contrast to programming computers, microprocessors and controllers, the FPGA programming is thus not aimed at a predefined operating system and a driver basis. Instead, the FPGA programming is aimed at defining structures in the semiconductor, which carry out the intended functions later on. In this way, a degree of specialization and parallelism may be achieved, which is difficult to reach by conventional, prefabricated microprocessors.

Various FPGA models in rapid control prototyping (RCP) and hardware in the loop (HiL) real-time systems scale with the size of the block RAM available in the FPGA. The special feature of FPGA block RAM is that it is made up, for example, of many individual 36 Kb blocks, each having its own data and address bus (data bus: up to 32 (36) bits or 64 (72) bits, address bus: 2×15 bits). The individual blocks may be used to implement many small distributed as well as large, interconnected block RAMs having arbitrary constellations of small data bus width and great memory depth or great data bus width and low memory depth. A data bus of 10 RAMB36 blocks may be, for example, 10 bits or 640 bits wide, which results in a varying number of storable elements of this width, the so-called memory depth. In addition, the block RAM may read out or store data with each clock pulse and with a latency of only one clock pulse after the address transfer. Due to these two properties, large vectors or entire matrices, which are used, for example, for a multiplication, may switch over in only one clock pulse, in that the database of the block RAM is selected to be as wide as the vector is long, or by using a block RAM construct having the width of the row vector for each row of a matrix. For example, the multiplication performance is thus limited only via the implementation of the arithmetic logic unit and no longer by the memory interface. The number of different vectors or matrices is limited by the size of the block RAM in the FPGA. To increase this memory, possibilities include, for example, UltraRAM, HBM (high bandwidth memory, which is stacked directly on the FPGA die and is connected directly to the FPGA die via a large number of lines) or favorable DDR4 memories. The dSPACE DS6602 FPGA baseboard has 4 GB of external DDR4 connected to a 32 bit interface at 2 GHz and thus achieves a data rate of 7.37 GB/s with linear reading. However, DDR4 memory has a significantly higher latency for an access, which may also be interrupted by a refresh.

Users have up to now had to handle the memory management themselves during modeling. The complexity of the memory management, in which the memory contents of the block RAM memory had to be exchanged with values from a high latency memory at the right time, is often shied away from, and the modeling is limited to the small amount of the available block RAM. Many use cases may therefore not be implemented.

SUMMARY OF THE INVENTION

It is therefore an object of the present invention to provide a computer-implemented method, in which a first memory of the FPGA, in particular a block RAM memory of the FPGA, is effectively increased by an implementation of a model-adaptive cache memory having a model state-dependent memory look-ahead.

According to an example, the object according to the invention is achieved by a computer-implemented method for implementing a model-adaptive cache memory having a model state-dependent memory look-ahead on an FPGA for effectively increasing a first memory of the FPGA, the method comprising the following steps: Setting up an application on the FPGA, the application comprising a state interface, so that a current state of the application may be read out from the outside at runtime; Specifying, in the application, data which require a fast access at runtime, the data being marked as caching data, the caching data being anticipatorily preloaded at runtime; Setting up a memory interface for reading out the first memory by the application, the bit width of the memory interface being model-adaptively specified in such a way that the application is able to read out within one clock pulse all data stored in the first memory or a data structure stored in the first memory, which comprises a multiplicity of data entries; Storing the specified caching data at least partially in a second memory during the setup of the application on the FPGA; Storing a routine for managing the cache memory on the FPGA, the routine setting up the first memory as a cache memory for the specified data, the routine comprising a state input, which is linked with the state interface of the application; Storing an overview on the FPGA, in which possible states of the application are assigned to data from the second memory which will probably be accessed by the application in a subsequent state, the routine continuously consulting the overview at runtime and transferring caching data which will probably be accessed by the application in a subsequent state from the second memory to the first memory; Accessing the caching data shifted to the first memory by the application, the access taking place via the memory interface.

The basic idea of the present invention is that an application is set up on an FPGA, which has access to a first small memory having a short access time and to a second large memory having a relatively long access time. The user specifies data in the application, which require fast access at runtime. These data are marked as caching data, which are anticipatorily preloaded (cached) at runtime. The user also specifies a bit width for the cache. Normal CPU caches speed up, for example, only a DDR4 access to a fixed interface (e.g., 32/64 bit CPU database) lasting multiple clock pulses. The FPGA cache described here has an interface which is as wide as, for example, model vectors contained in the data structure or model matrices. A large new vector or a matrix may also be read thereby in only one clock pulse. The cache is model-adaptively generated with respect to the bit width and required memory size. It is essential that a large, higher-level data unit exists, and the application must be able to read out a complete data unit within one clock pulse. For example, if multiple matrices are stored in the memory, the application must always process an entire matrix all at once. The interface is then selected in such a way that all entries of a matrix may be read out in parallel. The term data structure may be understood in very general and broad terms. It is a structure because the data are arranged and linked in the present case in a certain way to efficiently facilitate the access thereto and their management. In particular, the data structure is only an object which is used to store and organize data. When setting up the application on the FPGA, the caching data specified by the user are at least partially stored in the slow, large memory, because the fast memory is too small to accommodate all the caching data. The customer application comprises a state interface, where a current state of the application may be read out from the outside at runtime. With the aid of the application, a memory management routine is stored in the FPGA, which sets up the small memory as a cache for the data specified by the user. The routine comprises a state input, which is linked with the state interface of the application. The state input is also referred to as a status input within the scope of this description, and the state interface is also referred to as a state output.

An overview is also stored on the FPGA, in which possible states of the application are assigned to data from the large memory, which are likely to be accessed by the application in state to follow shortly. The routine continuously consults the overview at runtime to transfer data which is likely to be accessed by the application from the large memory to the fast small memory. The user routine accesses the data transferred to the small memory. This access takes place via an interface of the small memory, the interface being set up on the FPGA along with the application. The interface's bit width is selected in such a way that the application is able to read out all data stored in the small memory within one clock pulse. The cache itself is not a separate unit, which is connected between the memory and processor register as in the case of a processor. The cache itself is the memory, the outputs are directly the vectors and matrices which open, for example, into a matrix multiplier.

Prefetching for caches has up to now been based on hard-wired mechanisms (e.g., branch prediction) or self-learning methods without previous knowledge. The FPGA cache described here makes use of FPGA model information sent by its state input and thus offers a new model state-dependent prefetching. In the area of FPGAs, the possibility exists of generating, for many use cases, a cache suitable for the particular use case, which makes it possible to increase the low latency block RAM with the slower UltraRAM, HBM, or DDR2 with the aid of prefetching.

The step of storing an overview on the FPGA can comprise the following additional steps: Storing at least two probability tables for each possible current state on the FPGA, a first probability $P_{SegmentUsage}(s)$ indicating the probability of the state accessing certain data, and a second probability indicating the probability $P_{StateTransition}(s)$ of certain states following the current state; Calculating a segment probability $P_{Segment}(s)$ from the two probability tables for the current state as to which data will probably be accessed by the application in the subsequent state, the data having the highest probability being anticipatorily loaded to the first memory of the FPGA.

A segment can be understood to be a memory unit of a predefined size, in which a conglomerate of data is stored, for which a common segment probability is calculated at each point in time. A segment is advantageously always loaded completely to the first memory. The size of a segment may be identical to a memory cell size of the first memory and the second memory which may not be divided for technical reasons. However, the size of a segment may also be larger than a memory cell size of the first memory or the second memory, for example to adapt the segment size to the size of a data structure stored in the first memory or to keep the number of data items listed in the overview sufficiently small.

Two probability tables are stored for each possible current state. A first probability table indicated the probability of the state accessing certain data, the second probability table indicates the probability of certain states following the current state. Which data will probably be accessed by the application in the subsequent state is calculated from the two overviews for the current state. The data having the highest probability are anticipatorily loaded, for example, to the very fast but small block RAM of the FPGA. The interface of the block RAM from which the application reads out the cached data is matched to the application and is so wide that a data structure stored in the cache or even the entire cache may be read out all at once within one clock pulse.

In the step of calculating a segment probability $P_{Segment}(s)$ from the two probability tables for the current state, the data which will probably be accessed by the application in the subsequent state can be calculated using the following formula:

$$P_{Segment}(s) = \sum_{s_{Subsequent}=1}^{n} P_{StateTransition}(s, s_{Subsequent}) \cdot P_{SegmentUsage}(s_{Subsequent})$$

It is preferred that, if the most probably blocks are present in the cache memory, the transfer from the second memory to the first memory may be paused until the segment probabilities $P_{Segment}(s)$ have changed.

Segment probabilities $P_{Segment}(s)$ can be calculated offline for each state or calculated online in the FPGA. Segment probability $P_{Segment}(s)$ may be precalculated offline for each state s and stored in the FPGA, for example in the form of a lookup table. With the exception of the lookup table, this does not cost any FPGA resources or any calculation latency in the FPGA real-time application.

The first memory can be a block RAM memory of the FPGA. What is special about FPGA block RAM is that it is made up of many individual 36 Kb blocks, each having its own data and address bus (data bus up to 32 (36) bits or 64

(72) bits, address bus: 2×15 bits). The individual blocks may be used to implement many small distributed as well as large interconnected block RAMs having arbitrary constellations of small data bus width and great memory depth or great data bus width and low memory depth. A data bus of 10 RAMB36 blocks may be, for example 10 bits or 640 bits wide, which results in a varying number of storable elements of this width, the so-called memory depth. In addition, the block RAM may read out or store data with each clock pulse and with a latency of only one clock pulse after the address transfer. Due to these two properties, large vectors or entire matrices, which are used, for example, for a multiplication, may switch over in only one clock pulse, in that the database of the block RAM is selected to be as wide as the vector is long, or by using a block RAM construct having the width of the row vector for each row of a matrix. For example, the multiplication performance is thus limited only via the implementation of the arithmetic logic unit and no longer by the memory interface.

In an example, not only the model-adaptive bit width but also a model-adaptive memory depth of the application is specified. The user may optionally specify not only the bit width but also a memory depth and thus the number of memory cells for a single item of data in each case.

The state can be defined by a state vector or a finite state machine. A finite state machine (FSM, also known as a finite state automaton) is a model of a behavior, made up to states, state transitions, and actions. A state may contain information about the past, since the system has, after all, reached the state via its previous path. In other words, it reflects to a certain extent the changes to the input from the system startup to the current point in time. A state transition is a transition from the current state to a new (different) state. This transition takes place when the indicated logical conditions/"inputs" are present which must be met to facilitate the transition. An action is the "output" of the FSM which takes place in a certain situation.

The routine in the cache can overwrite data for which a low probability is stored in current state $s_N$.

The overview can be predefined and is loaded together with the application to the FPGA in the form of a lookup table.

The overview can be created manually, for example based on an analysis of the model, or in a self-learning manner based on a simulation of the application.

The overview can be self-learning and can be generated automatically at the runtime of the model by logging the program run.

The subsequent state can be temporally removed from the current state in each case by no more than N state changes of the application, N being a low natural number as measured by the total number of state changes taking place at the runtime of the application, in particular N<100, N<10, or N=1.

A further aspect of the invention relates to the use of the computer-implemented method for implementing a model-adaptive cache memory having a model state-dependent memory look-ahead on an FPGA for effectively increasing a first memory of the FPGA in rapid control prototyping (RCP) applications and hardware in the loop (HiL) applications.

According to a further aspect, the object according to the invention is achieved by a computer program product, including commands, which, upon the execution of the program by a computer, prompt the latter to carry out the method described above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
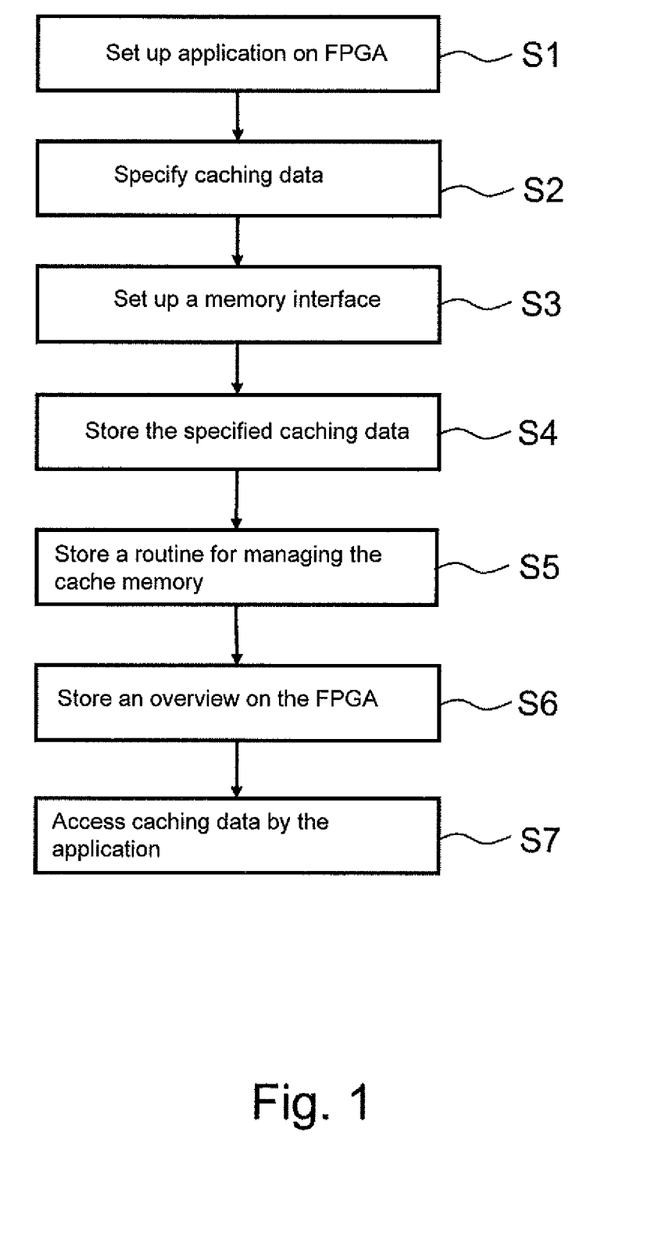
FIG. 1 shows a flowchart of a computer-implemented method for effectively increasing a first memory of an FPGA according to one exemplary embodiment of the invention.

FIG. 1 shows a flowchart of a computer-implemented method for effectively increasing a first memory of an FPGA according to one exemplary embodiment of the invention. The effective increase is achieved by an implementation of a model-adaptive cache memory having a model state-dependent memory look-ahead on an FPGA. In step S1, an application is set up on the FPGA, the application comprising a state interface, so that a current state of the application may be read out from the outside at runtime.

In step S2 data is subsequently specified in the application which require a fast access at runtime. These data are marked as caching data, the caching data being anticipatorily preloaded at runtime.

In step S3, a memory interface is set up for reading out the first memory by the application, the bit width of the memory interface being model-adaptively specified in such a way that the application is able to read out, within one clock pulse, all data stored in the first memory or a data structure stored in the first memory, which comprises a multiplicity of data entries. The first memory may be, in particular, a small memory having a short access time, such as a block RAM memory of the FPGA.

In the next step S4, specified caching data are at least partially stored in a second memory during the setup of the application on the FPGA. The second memory may be, for example, a large memory having a relatively long access time.

In step S5, a routine for managing the cache memory is stored on the FPGA, the routine setting up the first memory as a cache memory for the specified data. The routine comprises a state input, which is linked with the state interface of the application.

In step S6, an overview is stored on the FPGA, in which data from the second memory, which will probably be accessed by the application in a subsequent state, are assigned to the possible states of the application, the routine continuously consulting the overview at runtime and transferring caching data which will probably be accessed by the application in a subsequent state from the second memory to the first memory. In one exemplary embodiment of the invention, the overview is generated on the basis of two statistics. The latter indicate for each state $s_N$ which state is to follow current state $s_N$ with which probability; and which data will be accessed by the current state with which probability. A probability is calculated from these two pieces of information for each item of data. For this purpose, at least two probability tables are stored on the FPGA for each possible current state, a first probability $P_{SegmentUsage}(s)$ indicating the probability of the state accessing certain data, and a second probability indicates the probability $P_{StateTransition}(s)$ of certain states following the current state. In the next step, a segment probability $P_{Segment}(s)$ is calculated from the two probability tables for the current state as to which data will probably be accessed by the application in the subsequent state, the data having the highest probability being anticipatorily loaded to the first memory of the FPGA.

Since the setup of a program logic on the FPGA takes place by a transmission of a bit stream defining the program logic and then occurs within a single work step, method steps S1 through S6 are not necessarily to be understood as chronologically sequential method steps. Although it is generally possible with the aid of partial programming to set up individual components of a program logic individually and sequentially on an FPGA, method steps S1 through S6 may also be carried out simultaneously within the scope of a single programming operation.

In a further exemplary embodiment of the invention, in the step of calculating a segment probability $P_{Segment}(s)$ from the two probability tables for the current state, the data which will probably be accessed by the application in the subsequent state are calculated using the following formula:

$$P_{Segment}(s) = \sum_{s_{Subsequent}=1}^{n} P_{StateTransition}(s, s_{Subsequent}) \cdot P_{SegmentUsage}(s_{Subsequent})$$

In step S7, the caching data shifted to the first memory are accessed by the application, the access taking place via the memory interface.

The ascertainment of the access probabilities is explained in greater detail below. The supply of the access probabilities to the prefetcher may take place according to different exemplary embodiments of the invention in the following ways. The first option for ascertaining the access probabilities are self-learning access probabilities. The access probability of all RAM segments of a certain size, i.e., 1 MB, is ascertained as follows. The access probabilities to RAM segments are first logged. A counter for all RAM segments r is set for each state s, resulting in an s×r matrix Z. The accesses to the RAM are logged in matrix Z for each state. The transition probabilities of states are then logged, in that the transitions between the states are counted in an s×s matrix, so that, for example, the transition probability from a state x to a subsequent state y is indicated. 0% would mean that a transition is not possible, 100% means that the only valid subsequent state of x is y.

It may be provided that the access probabilities are completely defined by the user. For example, the user defines the possible states of the state input port, the possible state transitions, the memory segments most likely to be used by each state, and the transition probabilities between the states. The whole thing may take place, for example, in a graphical state diagram.

A further possibility is to ascertain the access probabilities from model information. For example, if the state input is based on a state machine generated with the aid of tools such as Simulink Stateflow, the following information may be automatically taken therefrom: the possible states of the state input and the possible state transitions. If necessary, the following information may be taken from an offline or online simulation of the model: the memory segments most likely to be used by each state as well as the transition probabilities between the states. Alternatively, the user defines the memory segments most likely to be used by each state and the transition probabilities between the states.

The operation of the model state-dependent prefetcher is described in greater detail below. The prefetching system permanently loads the memory segments which are most likely to be needed for the subsequent states, the state transition to the same state also being identified by a probability. According to its segment probability $P_{Segment}(s)$ in state s, which results from the state transition probability $P_{StateTransition}(s)$ from current state s to a subsequent state $s_{Subsequent}$ and the probability of a RAM segment being used in subsequent state $P_{SegmentUsage}(s)$:

$$P_{Segment}(s) = \sum_{s_{subsequent}=1}^{n} P_{StateTransition}(s, s_{Subsequent}) \cdot P_{SegmentUsage}(s_{Subsequent})$$

Example: If it is ascertained from the model or by user input that a change from current state $s_N$ rarely occurs, the state transition probability from the current state to itself is the highest. In addition, however, all RAM segments of each state also have a probability of being used. If the state transition probability from current state $s_n$ to all states $s_1$ through $s_m$ is multiplied in each case by the probabilities of all RAM segments in the particular states and the sum of all states is formed for each RAM segment, a ranking list of the most probable RAM segments is obtained after sorting the sums. If the state transition probability from state $s_n$ to itself is, for example, 75%, a large number of RAM segments, which are used frequently by state $s_N$ will presumably be at the top of the ranking list. Nevertheless, elements of another state may also turn up there, even if they have a state transition probability of only, for example, 20%, while a certain RAM segment is used by this state with a probability of 95%. If the most probable blocks are present in the cache, the prefetching is paused until the segment probabilities have changed. If an access to a segment which is not yet present in the cache takes place in the meantime, it is loaded to the least probable segment of the cache as a priority. To avoid a latency at this point, the number of the least probable segment is always precalculated. A simultaneous prefetching is immediately aborted and the corresponding block invalidated. These segment probabilities for each state may be calculated either offline, e.g. during the FPGA build, or online in the FPGA. The calculation of segment probability $P_{Segment}(s)$ could be optionally further expanded in that the probability is included not only for segments depending on one subsequent state but also for 2 or more subsequent states.

It may therefore be provided that the segment probabilities are precalculated offline. Segment probability $P_{Segment}(s)$ may be precalculated offline for each state s and stored in the FPGA in the form of a lookup table. With the exception of the lookup table, this does not cost any FPGA resources or any calculation latency in the FPGA real-time application. Even the lookup table is smaller than if the calculation were to take place online in the FPGA, since no probabilities are needed any longer in the FPGA for a calculation but only the list of segment numbers, presorted according to their segment probability $P_{Segment}(s)$. Only the quantity of segment numbers equal to the size of the cache is needed as a maximum for each state, since no more than this can be prefetched. With 4 states and a cache size of 128 segments, this amounts to 4×128 entries of a segment number. Assuming a RAM size of, for example, 65,536 segments, 4×128×16 bits=8,192 bits=1 kB are therefore needed. This is negligible with 34.6 Mb of block RAM.

It may also be provided that segment probabilities $P_{Segment}(s)$ are calculated online in the FPGA. The online calculation in the FPGA is advantageous if the self-learning variant is selected for determining the access probabilities, or if a particular event E results in a change of the state transition probabilities during runtime. If, in the second application case, the possible changes are known, different lookup tables could be precalculated and switched over offline here as well. This possibilities is more likely to be advantageous in the case of unpredictability or frequent variations, since too many variants of lookup tables would otherwise have to be precalculated and maintained.

Figure 3:
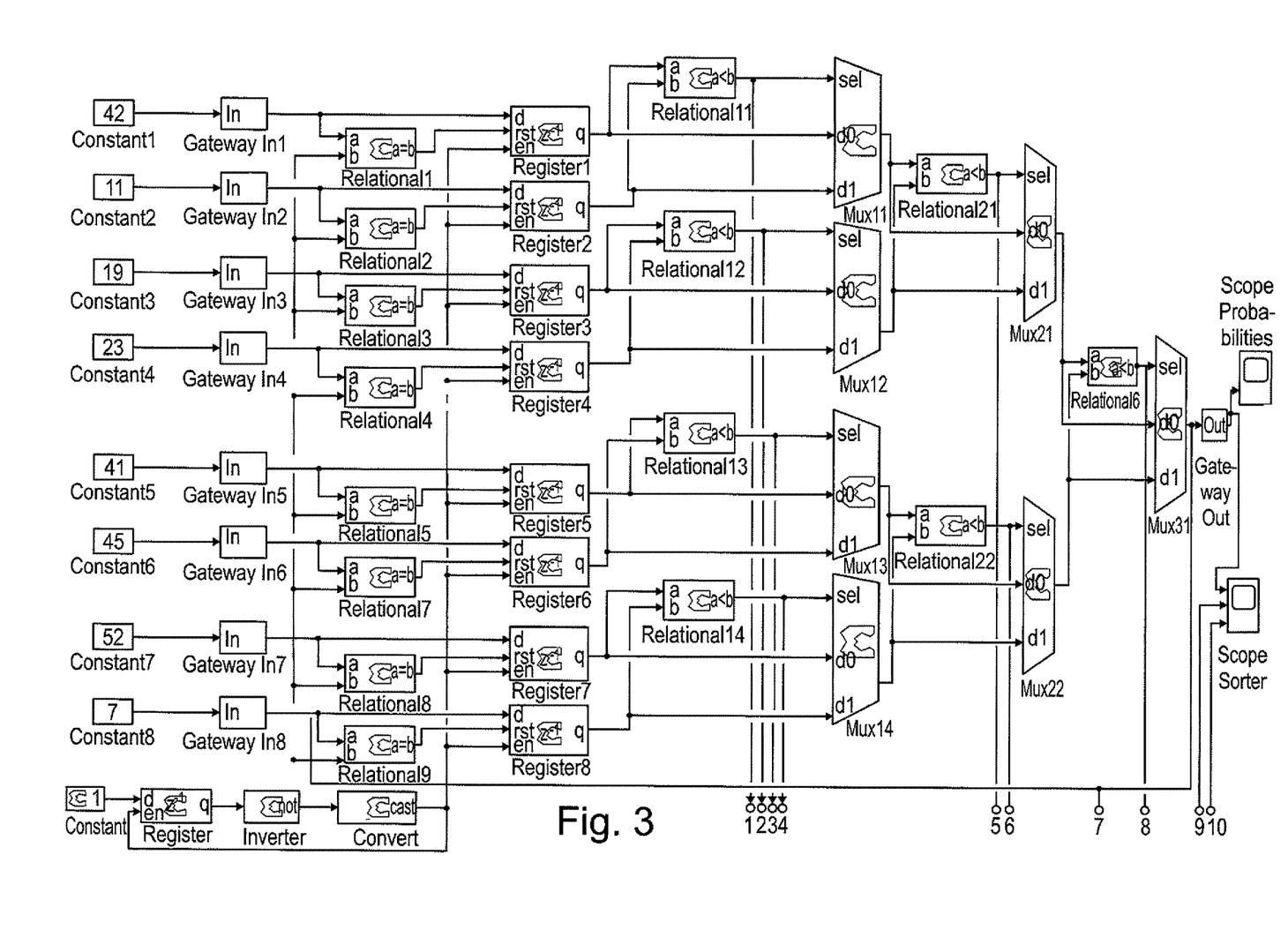
FIG. 3 shows a diagram of an FPGA low latency sorter according to one exemplary embodiment of the invention.

For an online calculation, memory is needed for state transition probability $P_{StateTransition}(S, S_{Subsequent})$ and the probability of a RAM segment being used in subsequent state $P_{SegmentUsage}(s_{Subsequent})$. In the case of 4 states, this is 4ˆ4=16 entries for the state transition probabilities and 4×RAM segment quantity entries for the usage probabilities. The online calculation of the next value to be prefetched, made up of multiplication, summation, and sorting, requires additional resources in the FPGA, which, in one exemplary embodiment of the invention, may be reduced as follows. The probabilities are not stored in floating-point but in easy-to-calculate units. It may additionally be provided that the probabilities of the RAM segments per state are not multiplied by the state transition probabilities but are shifted by their value within a single clock pulse. The state transition probabilities are correspondingly not stored as factors but as the number of shifts. Since there is always a factor of 2 between two different shifts, they are therefore provided with a range of, e.g. {0, 1, 2, 3, 4, 5}, which corresponds to a factor {0, 2, 4, 8, 16, 32}. The probabilities {0, 0.0625, 0.125, 0.25, 0.5, 1} may be represented thereby. Each state transition probability is rounded off to one of these replacement values, even if the sum of all state transition probabilities is no longer 1 afterwards and is stored as a shift value {0, 1, 2, 3, 4, 5}. In this case, accuracy is exchanged for speed. This optimization is only one example of an optional optimization. The summation of two Uint numbers takes place is less than one clock pulse and therefore does not induce a latency if the other operations may also be carried out within the same clock pulse. The summed probabilities for each state are subsequently placed on a sorted overall list. In one exemplary embodiment of the invention, this may be achieved in that pairs of probabilities and segment numbers of all states in the low latency sorter illustrated in FIG. 3 are given in the form of a binary tree with the probabilities as leaves, based on an asynchronous comparator network. The low latency sorter supplies a new segment number to each clock pulse according to the sorted probability. In the plots in FIG. 3, a segment number is present only starting with the 2nd clock pulse; since clock pulse 1 is needed for generating the probability & segment number of all states for the simulation, this clock pulse is omitted in real operation.

It may be provided, for example, that no multiplication, summation, and sorting take place at all, but instead a corresponding number of segments are taken from presorted lists of the probabilities of the RAM segments in each state, depending on the state transition probability, which may have changed at model runtime. This is a compromise between accuracy and maximum speed with low resource demand.

The list of the most probable segments in a state is already sorted in advance according to probabilities. The sorted list is shortened to the cache size, since no prefetching is possible anymore. This variant is a good choice for the online situation, due to its simplicity, and yet combines the two core points for the online situation, namely the model state-dependent prefetching via the state input port based on advance knowledge of the known RAM segment probabilities per state, even for varying state transition probabilities.

Figure 2:
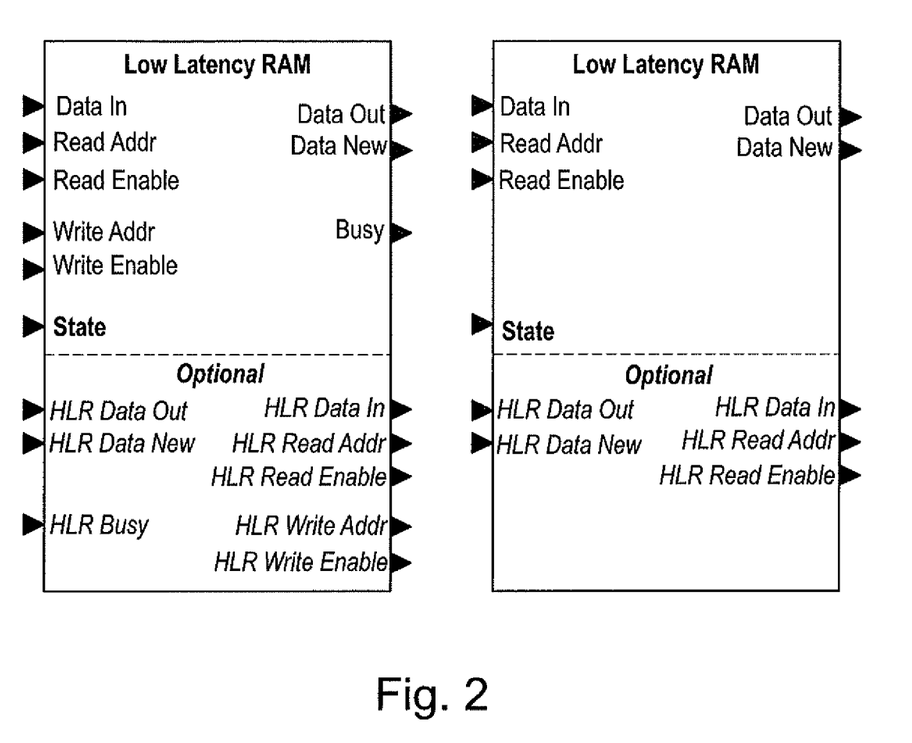
FIG. 2 shows a block diagram of a low latency RAM/ROM block, including optional high latency RAM/ROM ports, according to one exemplary embodiment of the invention.

FIG. 2 shows a block diagram of a low latency RAM/ROM block, including optional high latency RAM/ROM ports, according to one exemplary embodiment of the invention. The FPGA cache controller described here, also referred to as low latency RAM/ROM in the description, includes all typical elements from the prior art. It results, for example, in a list of the currently cached addresses, establishes cache coherence for write accesses to the low latency RAM/ROM, has a pipeline-capable 1-clock latency memory, like a typical cache, in this case in the form of block RAM. The prefetcher has a model input in the form of a state port and may thus access model-inherent information such as states, state transitions, memory demands, and therefore segment probabilities, or request these from the modeler, since this is generally known information. For example, for the switch setting of 10 digital inputs, not all 2ˆ10 possible subsequent switch settings may be permitted but only 2ˆ4. The matrices in memory segments $r_{712}$ through $r_{768}$ are needed for these 16 positions, and they may therefore be already preloaded by means of prefetching. Quite a few further examples, such as state machines from Simulink Stateflow, could also be mentioned. The probabilities may also be ascertained from offline or online simulations previously carried out. It is assumed that two simulations (or real) runs do not run entirely differently. For implementation, the user may include, for example, the low latency RAM/ROM block (comprising cache, cache controller, and possibly high latency RAM/ROM) into his/her model like in a normal block RAM. The user then indicates which memory width and memory depth is needed. The indication of the additional high latency RAM/ROM to be used (e.g., DDR4) may take place in two ways. On the one hand, it may also take place via the block GUI or, on the other hand, via displayable data and address ports for a high latency memory, whose block may then be connected to these ports by the customer. In the case of the block GUI, the high latency memory is automatically instantiated, parameterized, and connected under/in the block. It is important to connect the state vector to the state input port of the new block. In contrast to processors, on which the prefetching operation has a performance impact, in particular in single cores, due to additional sequentially operating program instructions (unless a specialized cache controller takes on this task), this connection does not disadvantageously influence the remaining functionality on the FPGA hardware operating in parallel if competing memory access is avoided.

All features explained in connection with individual specific embodiments of the invention may be provided in different combinations in the subject matter according to the invention to implement their advantageous effects simultaneously, even if they were described in relation to different specific embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for implementing a model-adaptive cache memory having a model state-dependent memory look-ahead on an FPGA for effectively increasing a first memory of the FPGA, the method comprising:
setting up an application on the FPGA, the application comprising a state interface, so that a current state of the application is read out from an outside at runtime;
specifying, in the application, data which require a fast access at runtime, the data being marked as caching data, the caching data being preloaded at runtime;
setting up a memory interface for reading out the first memory by the application, the bit width of the memory interface being model-adaptively specified such that the application is able to read out within one clock pulse all data stored in the first memory or a data structure stored in the first memory, which comprises a plurality of data entries;
storing the specified caching data at least partially in a second memory during the setup of the application on the FPGA;
storing a routine for managing the cache memory on the FPGA, the routine setting up the first memory as a cache memory for the specified data, the routine comprising a state input, which is linked with the state interface of the application;
storing an overview on the FPGA, in which possible states of the application are assigned to data from the second memory which will probably be accessed by the application in a subsequent state, the routine continuously consulting the overview at runtime and transferring caching data which will probably be accessed by the application in a subsequent state from the second memory to the first memory; and
accessing the caching data shifted to the first memory by the application, the access taking place via the memory interface.

2. The computer-implemented method according to claim 1, wherein the step of storing an overview on the FPGA comprises:
storing at least two probability tables for each possible current state on the FPGA, a first probability $P_{SegmentUsage}(s)$ indicating the probability of the state accessing certain data, and a second probability indicating the probability $P_{StateTransition}(s)$ of certain states following the current state; and
calculating a segment probability $P_{Segment}(s)$ from the two probability tables for the current state as to which data will probably be accessed by the application in the subsequent state, the data having the highest probability being anticipatorily loaded to the first memory of the FPGA.

3. The computer-implemented method according to claim 2, wherein, in the step of calculating a segment probability $P_{Segment}(s)$ from the two probability tables for the current state, the data which will be accessed by the application in the subsequent state are calculated using the following formula:

$$P_{Segment}(s) = \sum_{s_{Subsequent}=1}^{n} P_{StateTransition}(s, s_{Subsequent}) \cdot P_{SegmentUsage}(s_{Subsequent})$$

4. The computer-implemented method according to claim 3, wherein, if the most probable blocks are present in the cache memory, the transfer from the second memory to the first memory is paused until the segment probabilities $P_{Segment}(s)$ have changed.

5. The computer-implemented method according to claim 3, wherein the segment probabilities $P_{Segment}(s)$ are calculated offline for each state or are calculated online in the FPGA.

6. The computer-implemented method according to claim 1, wherein the first memory is a block RAM memory of the FPGA.

7. The computer-implemented method according to claim 1, wherein, in addition to the model-adaptive bit width, a model-adaptive memory depth of the application is also specified.

8. The computer-implemented method according to claim 1, wherein the state is predefined by a state vector or a finite state machine.

9. The computer-implemented method according to claim 1, wherein the routine in the cache overwrites data for which a low probability is stored in the current state.

10. The computer-implemented method according to claim 1, wherein the overview is predefined and is loaded to the FPGA together with the application in the form of a lookup table.

11. The computer-implemented method according to claim 1, wherein the overview is created manually based on an analysis of the model or is generated in a self-learning manner based on a simulation of the application.

12. The computer-implemented method according to claim 1, wherein the overview is self-learning and is automatically generated at runtime by logging the program run.

13. The computer-implemented method according to claim 1, wherein the subsequent state is temporally removed from the current state in each case by no more than N state changes of the application, N being a low natural number measured by the total number of state changes taking place at the runtime of the application, and wherein $N<100$, $N<10$, or $N=1$.

14. The computer-implemented method according to claim 1, wherein the method implements a model-adaptive cache memory having a model state-dependent memory look-ahead on an FPGA for increasing a first memory of the FPGA in rapid control prototyping applications and hardware in the loop applications.

15. A non-transitory computer-readable media comprising commands, which, when executed by a computer carries out a method for implementing a model-adaptive cache memory having a model state-dependent memory look-ahead on an FPGA for effectively increasing a first memory of the FPGA, the method comprising:
setting up an application on the FPGA the application comprising a state interface, so that a current state of the application is read out from an outside at runtime;
specifying, in the appiication, data which require a fast access at runtime, the data being marked as caching data, the caching data being preloaded at runtime;

setting up a memory interface for reading out the first memory by the application, the bit width of the memory interface being model-adaptively specified such that the application is able to read out within one clock pulse all data stored in the first memory or a data structure stored in the first memory, which comprises a plurality of data entries;

storing the specified caching data at least partially in a second memory durino the setup of the application on the FPGA;

storing a routine for managing the cache memory on the FPGA, the routine setting up the first memory as a cache memory for the specified data, the routine comprising a state input, which is linked with the state interface of the application;

storing an overview on the FPGA, in which possible states of the application are assigned to data from the second memory which will probably be accessed by the application in a subsequent state, the routine continuously consulting the overview at runtime and transferring caching data which will probably be accessed by the application in a subsequent state from the second memory to the first memory; and accessing the caching data shifted to the first memory by the application, the access taking place via the memory interface.

* * * * *